United States Patent [19]

Tokoro et al.

[11] Patent Number: 5,095,435

[45] Date of Patent: Mar. 10, 1992

[54] APPARATUS FOR CONTROLLING LOCK-UP CLUTCH IN VEHICLE AUTOMATIC TRANSMISSION ACCORDING TO FUZZY SET THEORY

[75] Inventors: Setsuo Tokoro, Susono; Mitsuru Takada, Toyota, both of Japan

[73] Assignee: Toyota Jidosha Kabushiki Kaisha, Toyota, Japan

[21] Appl. No.: 568,715

[22] Filed: Aug. 17, 1990

[30] Foreign Application Priority Data

Aug. 25, 1989 [JP] Japan .................. 1-219243

[51] Int. Cl.$^5$ .................. B60K 41/22; G06G 7/00
[52] U.S. Cl. .................. 364/424.1; 74/866
[58] Field of Search .............. 364/424.1, 513; 74/866

[56] References Cited

U.S. PATENT DOCUMENTS

| | | | |
|---|---|---|---|
| 4,809,175 | 2/1989 | Hosaka et al. | 364/424.01 |
| 4,841,815 | 6/1989 | Takahashi | 74/866 |
| 4,911,259 | 3/1990 | Dogahara et al. | 180/170 |
| 4,916,979 | 9/1990 | Irwin | 364/424.1 X |
| 4,930,084 | 5/1990 | Hosaka et al. | 364/424.06 |
| 5,019,979 | 5/1991 | Takahashi | 364/424.1 |
| 5,021,958 | 6/1991 | Tokoro et al. | 364/424.1 X |
| 5,036,730 | 8/1991 | Sakai et al. | 364/424.1 X |

FOREIGN PATENT DOCUMENTS

| | | | |
|---|---|---|---|
| 375155 | 6/1990 | European Pat. Off. | 395/900 |
| 63-176739 | 6/1988 | Japan . | |

OTHER PUBLICATIONS

"Expert System on a Chip: An Engine for Real-Time Approximate Reasoning", M. Togai et al., IEEE Expert, Dec. 1986, pp. 55-62.
"A Fuzzy Knowledged-Based System Shell-System Z-1", K. S. Leung et al., Proceedings TENCON 87, IEEE, Aug. 1987, pp. 655-659.
"Synthesis of Fuzzy Models for Industrial Processes-Some Recent Results", R. M. Tong, Int. J. General System, Dec. 1978, vol. 4, pp. 143-162.
"Fuzzy PID Controller", H. R. van Nauta Lemke et al., 24th Conference on Decision and Control, Dec. 85, pp. 603-608.
"The Concept of Grade of Membership", R. Giles, Fuzzy Sets and Systems 25, Dec. 1988, pp. 297-323.

Primary Examiner—Parshotam S. Lall
Assistant Examiner—Thoms S. Auchterlonie
Attorney, Agent, or Firm—Oblon, Spivak, McClelland, Maier & Neustadt

[57] ABSTRACT

An apparatus for controlling a lock-up clutch in a vehicle automatic transmission having a speed changing mechanism and a fluid coupling, wherein an engine is connected directly to the speed changing mechanism when the lock-up clutch is engaged. The apparatus includes a determining device for determining satisfaction degrees of at least one basic fuzzy set theory rule corresponding to the released and engaged positions of the clutch, based on a predetermined clutch control pattern, a first calculating device for calculating satisfaction degrees of fuzzy set control rules, corresponding to the two positions of the clutch, depending upon a detected vehicle running condition, a second calculating device for calculating overall satisfaction degrees for selecting the respective positions of the clutch, based on the calculated satisfaction degrees of the basic fuzzy set theory rule or rules and the calculated satisfaction degrees of the fuzzy set control rules, and a selector for selecting one of the two positions of the clutch, based on the calculated overall satisfaction degrees.

6 Claims, 10 Drawing Sheets

○ ENGAGED OR ENERGIZED
× DEENERGIZED
✳ ENERGIZED WHEN LOCK-UP CLUTCH IS ENGAGED
△ ENGAGED FOR POSITIVE-TORQUE TRANSMISSION

| SHIFT LEVER POSITIONS | OPERATING POSITIONS | SOLENOIDS | | | CLUTCHES | | | BRAKES | | | | ONE-WAY CLUTCHES | | |
|---|---|---|---|---|---|---|---|---|---|---|---|---|---|---|
| | | No.1 | No.2 | No.3 | C1 | C2 | C3 | B1 | B2 | B3 | B4 | F1 | F2 | F3 |
| D | 1st | ○ | × | × | ○ | ○ | | | | | | △ | | △ |
| | 2nd | ○ | ○ | ✳ | ○ | ○ | | | | ○ | | △ | △ | |
| | 3rd | × | ○ | ✳ | ○ | ○ | ○ | | ○ | | | △ | | |
| | O/D | × | × | ✳ | | ○ | ○ | ○ | | | | | | |
| 2 | 1st | ○ | × | × | ○ | ○ | | | | | | △ | | △ |
| | 2nd | ○ | ○ | ✳ | ○ | ○ | | | | ○ | | △ | △ | |
| | 3rd | × | ○ | ✳ | ○ | ○ | ○ | | ○ | | | △ | | |
| L | 1st | ○ | × | × | ○ | ○ | | | | | ○ | △ | | △ |
| R | Rev | × | × | × | ○ | | ○ | | | | ○ | △ | | |
| P, N | | × | × | × | ○ | | | | | | | △ | | |

LOCK-UP CLUTCH POSITION

FIG.13

LOCK-UP CLUTCH POSITION

APPARATUS FOR CONTROLLING LOCK-UP CLUTCH IN VEHICLE AUTOMATIC TRANSMISSION ACCORDING TO FUZZY SET THEORY

BACKGROUND OF THE INVENTION

1. Field of the Invention

The present invention relates generally to an apparatus for controlling a lock-up clutch used in an automatic transmission of a motor vehicle, and more particularly to improvements in a control apparatus adapted to selectively engage or release such a lock-up clutch according to predetermined clutch-engaging and -releasing control patterns.

2. Discussion of the Related Art

An automatic transmission of a motor vehicle generally includes a fluid coupling device such as a torque converter connected to an engine of the vehicle, and a speed changing mechanism such as a planetary gear mechanism or a belt-and-pulley mechanism with variable-diameter pulleys, which is connected to the fluid coupling device. Power is transmitted through the fluid coupling device to the speed changing mechanism, and the speed ratio of the speed changing mechanism [input shaft speed/output shaft speed) is changed in steps or continuously. For improved fuel economy of the vehicle, some automatic transmissions of this type incorporate a lock-up clutch which is engaged to directly connect the speed changing mechanism to the engine, in certain running conditions of the vehicle.

Figure 4:
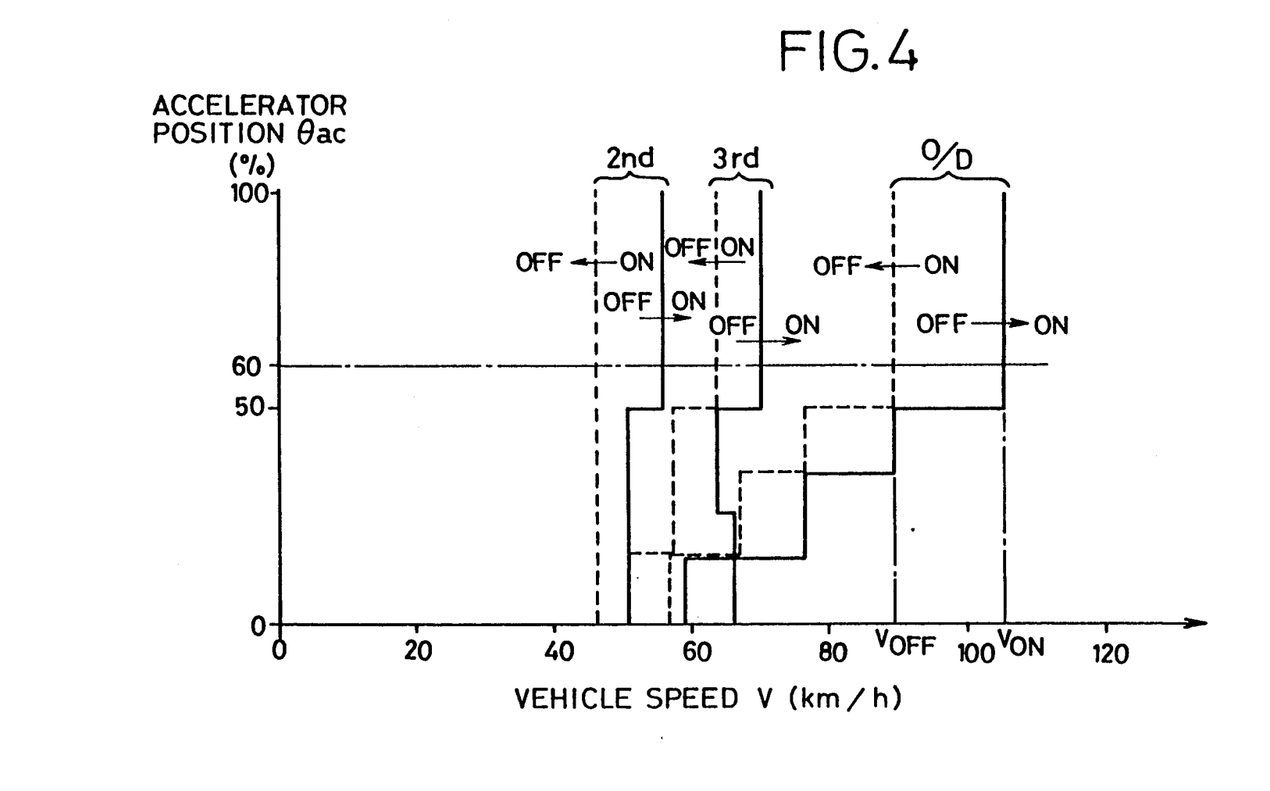
FIG. 4 is a diagram showing an example of clutch control patterns used by the clutch control apparatus.

Usually, a lock-up clutch is selectively engaged and released, according to predetermined clutch control patterns. FIG. 4 shows an example of the clutch control patterns for controlling a lock-up clutch used with a speed changing mechanism which has four forward drive positions. In this example, the clutch control patterns for selectively establishing the engaged and released positions of the lock-up clutch are defined in relation to two control parameters, that is, a currently detected running speed V of the vehicle and a currently detected accelerator pedal position (currently required output or currently detected load of the vehicle engine). In FIG. 4, the clutch control patterns are represented by solid lines indicative of clutch-engaging boundaries (OFF→ON boundaries) for operating the released lock-up clutch to the engaged position, and dashed lines indicative of clutch-releasing boundaries (ON→OFF boundaries) for operating the engaged clutch to the released position. The clutch-engaging and -releasing boundaries are set for each of the three forward drive positions (second-speed position, third-speed position and overdrive position) of the speed changing mechanism. When the speed changing mechanism is placed in the first-speed position having the highest speed ratio, the lock-up clutch is held in the released position. According to the clutch control patterns of FIG. 4, therefore, the lock-up clutch is selectively engaged and released depending upon the currently established position of the speed changing mechanism and the currently detected accelerator pedal position and vehicle speed. In the reverse position of the speed changing mechanism, the lock-up clutch is held in the released position.

For improving the adequacy of control of the lock-up clutch, it is considered to adjust or compensate the basic clutch control patterns according to compensating data maps, or use a large number of clutch control patterns, so that the lock-up clutch is more suitably controlled so as to meet the specific vehicle running condition of the vehicle such as the engine speed, and operating conditions of the accelerator and brake pedal positions. The compensation of the basic clutch control patterns or the use of many clutch control patterns permits optimum controlling of the lock-up clutch for enhanced driving comfort of the vehicle and reduced fuel consumption. However, this arrangement which uses many control parameters requires a considerably increased amount of control program data (control data maps), and therefore requires a large-capacity memory for storing such data, resulting in an increase in the cost of the control apparatus. Namely, the required amount of control program data increases in proportion to the number of control parameters raised to n-th power.

In view of the above drawback, the assignee of the present application developed a transmission control apparatus as disclosed in U.S. Pat. Application Ser. No. 352,498 filed May 16, 1989. This control apparatus does not use clutch control patterns or compensating data maps, but is adapted to control the lock-up clutch, according to calculated degrees of satisfaction of predetermined fuzzy set control rules for selectively engaging and releasing the lock-up clutch depending upon the running condition (running parameters) of the vehicle. Namely, the lock-up clutch is placed in one of the engaged and released positions which is selected based on the calculated satisfaction degrees of the fuzzy set control rules. In this arrangement, the required amount of control program data is proportional to the number of the control parameters (vehicle running parameters), and is therefore comparatively small, whereby the control apparatus may be simplified and available at a relatively reduced cost.

In the above arrangement, however, the required amount of control program data is larger than that in the arrangement using only the clutch control patterns, in the case where the number of control parameters for selecting the operating positions of the lock-up clutch is relatively small, for example, where only the accelerator pedal position and the vehicle speed are used as the control parameters. Thus, the conventional and recently proposed arrangements are not completely satisfactory in terms of the control reliability and simplicity.

SUMMARY OF THE INVENTION

It is therefore an object of the present invention to provide an apparatus for controlling a lock-up clutch in an automatic transmission of a motor vehicle, with a relatively reduced amount of control program data.

The above object may be achieved according to the principle of the present invention, which provides an apparatus for controlling a lock-up clutch of an automatic transmission for a motor vehicle wherein an engine is connected to a speed changing mechanism through a fluid coupling when the lock-up clutch is placed in a released position, and is directly connected to the speed changing mechanism when the lock-up clutch is placed in an engaged position, the released and engaged positions of the lock-up clutch being selected according to a predetermined clutch control pattern, the apparatus comprising: (a) determining means for determining satisfaction degrees of at least one basic fuzzy set theory rule corresponding to the released and engaged positions of the lock-up clutch, respectively, based on the predetermined clutch control pattern; (b) detecting means for detecting a running condition of the vehicle; (c) first calculating means for calculating satisfaction degrees of fuzzy set control rules, corresponding to the released and engaged positions, respectively, depending upon the running condition of the vehicle detected by the detecting means; (d) second calculating means for calculating overall satisfaction degrees for selecting the released and engaged positions, respectively, based on the satisfaction degrees of the at least one basic fuzzy set theory rule determined by the determining means and the satisfaction degrees of the fuzzy set control rules calculated by the first calculating means; and (e) selecting means for selecting one of the released and engaged positions of the lock-up clutch, based on the overall satisfaction degrees calculated by the second calculating means, so that the lock-up clutch is placed in the selected one of the released and engaged positions.

In the control apparatus of the present invention constructed as described above, the satisfaction degrees of the basic fuzzy set theory rule or rules are determined by the determining means, for the released and engaged positions of the lock-up clutch, based on the predetermined clutch control pattern. In the meantime, the satisfaction degrees of the fuzzy set control rules associated with the running parameters of the vehicle which collectively determine the vehicle running condition are calculated by the first calculating means, for the respective operating positions of the lock-up clutch. Based on the determined satisfaction degrees of the basic fuzzy set theory rule or rules and the calculated satisfaction degrees of the fuzzy set control rules, the overall satisfaction degrees for selecting the individual operating positions of the transmission are determined by the second calculating means, so that the selecting means selects one of the two operating positions of the lock-up clutch, based on the calculated overall satisfaction degrees. The present arrangement permits the lock-up clutch to be selectively placed in the released or engaged position, so as to meet a wide variety of running parameters of the vehicle, which cannot be dealt with by the known arrangement wherein the clutch control pattern is determined by only two parameters, i.e., accelerator pedal position and vehicle speed, for example.

The present control apparatus which utilizes both the clutch control pattern and the fuzzy set theory requires a reduced amount of control program data, as compared with an arrangement which uses many clutch control patterns or pattern compensating maps, to control the lock-up clutch depending upon the running parameters of the vehicle, even where the number of the parameters is relatively large.

Further, since the basic clutch control pattern is used (since the satisfaction degrees of the basic fuzzy set theory rule or rules are determined according to the basic clutch control pattern), the required overall amount of control program data is smaller in the present arrangement, than in the arrangement which uses only the fuzzy set theory to control the lock-up clutch.

In the present control apparatus, the overall satisfaction degree for selecting each of the operating positions of the transmission is calculated based on the basic clutch control pattern (satisfaction degree of the basic fuzzy set theory rule or rules) and the satisfaction degree of the appropriate fuzzy set control rule associated with the running condition of the vehicle. This arrangement does not require a procedure otherwise required for improving the control accuracy, as practiced in the arrangement wherein the clutch control pattern is compensated by obtaining the center of distribution of the calculated satisfaction degrees of the fuzzy set control rules. In this respect, too, the amount of the control program data required by the present control apparatus is reduced.

In one form of the present invention, the determining means provisionally selects one of the released and engaged positions of the lock-up clutch as a provisional position Lu* according to the predetermined clutch control pattern, and the at least one basic fuzzy set theory rule consists of a basic fuzzy set theory rule whose satisfaction degree corresponding to the selected one position of the lock-up clutch is higher than that corresponding to the other position. For example, the value of the satisfaction degree of the basic fuzzy set theory rule for the selected one of the two positions (provisional position Lu*) is set to "1", and that for the other position is set to "0.5". Thus, the non-provisionally selected position of the lock-up clutch is given a suitably determined satisfaction degree lower than that for the provisionally selected position Lu*.

The fuzzy set control rules whose satisfaction degrees are calculated by the first calculating means are determined so that the lock-up clutch is controlled according to the running condition of the vehicle such as the engine speed, and the operating condition of the accelerator pedal and/or brake pedal.

For instance, the fuzzy set control rules consist of a first control rule RON for selecting the engaged position of the lock-up clutch, and a second control rule $R_{OFF}$ for selecting the released position of the lock-up clutch, the first and second control rules $R_{ON}$ and $R_{OFF}$ are expressed by the following formulas:

$$R_{ON} = A \text{ and } [\{(B \text{ or } C) \text{ and } D\} \text{ or } E] \text{ and } F$$

$$R_{OFF} = G \text{ or } \{(B \text{ or } C) \text{ and } H\} \text{ or } I$$

where "A" represents a sub-rule A for determining a degree in which a speed of the engine falls within a stable range if the lock-up clutch is operated the engaged position, "B" represents a sub-rule B for determining a degree in which an accelerator pedal of the vehicle is in the process of being depressed, "C" represents a sub-rule C for determining a degree in which the accelerator pedal is in the process of being released, "D" represents a sub-rule D for determining a degree in which vibrations of the vehicle are not likely to be generated if the lock-up clutch is operated to the engaged position, "E" represents a sub-rule E for determining a degree in which the accelerator pedal is held at a constant position, "F" represents a sub-rule F for determining a degree in which the speed changing mechanism is placed in one of a second-speed position and an overdrive position, "G" represents a sub-rule G for determining a degree in which the speed of the engine falls within an unstable range if the lock-up clutch is operated to the engaged position, "H" represents a sub-rule H for determining a degree in which vibrations of the vehicle are likely to be generated if the lock-up clutch is operated to the engaged position, and "1" represents a sub-rule H for determining a degree in which the speed changing mechanism is not placed in one of the second-speed and overdrive positions.

In a further form of the invention, the second calculating means calculates the overall satisfaction degrees for the released and engaged positions of the lock-up clutch, respectively, each by obtaining an algebraic product of a corresponding one of the satisfaction degrees for the released and engaged engaged positions which are determined by the determining means, and a corresponding one of the satisfaction degrees for the released and engaged positions which are calculated by the first calculating means. In this case, the selector means selects one of the released and engaged positions of the lock-up clutch which corresponds to the higher one of the two overall satisfaction degrees.

In a still further form of the invention, the fuzzy set control rules and the at least one basic fuzzy set theory rule are selectively combined to provide a plurality of complex control rules. This arrangement may be employed, for example, where the determining means provisionally selects one of the released and engaged positions of the lock-up clutch as a provisional position Lu* according to the predetermined clutch control pattern, and the at least one basic fuzzy set theory rule consists of a basic fuzzy set theory rule Q whose satisfaction degree corresponding to the selected one position of the lock-up clutch is higher than that corresponding to the other position. In this case, the complex control rules consist of a first complex control rule $R_{ON}$ for selecting the engaged position of the lock-up clutch, and a second complex control rule $R_{OFF}$ for selecting the released position of the lock-up clutch. The first and second complex control rules $R_{ON}$ and $R_{OFF}$ are expressed by the following formulas:

$$R_{ON} = Q \text{ and } J$$

$$R_{OFF} = Q \text{ or } K$$

where, "J" represents a sub-rule j for determining a degree in which a time elapse after a last releasing action of the lock-up clutch is longer than a predetermined value, and "K" represents a sub-rule K for determining a degree in which the time elapse is shorter than the predetermined value.

The fuzzy set control rules or complex control rules may include suitable sub-rules for adjusting or modifying the clutch control pattern, depending upon the type of the vehicle, vehicle load (including the vehicle weight), specifications of the engine, and driver's desire or taste concerning the drivability of the vehicle. Further, some of the running parameters of the vehicle except for those (e.g., accelerator pedal position and vehicle speed) used for the clutch control pattern need not be covered by the fuzzy set control rules but may be dealt with by modifying the clutch control pattern or using two or more different clutch control patterns.

The values of the satisfaction degrees of the basic fuzzy set theory rule(s) and fuzzy set control rules (and their sub-rules) are "1" when the rules are completely satisfied, and are "0" when the rules are not satisfied at all. Usually, the satisfaction degrees are between "1" and "0" (inclusive), but may take only two values, i.e., either "1" or "0".

In the case where the fuzzy set theory rule or rules is/are included in the complex control rules as described above, the satisfaction degrees of the complex control rules represent the overall satisfaction degrees for selecting the respective released and engaged positions of the lock-up clutch. In this case, it may be considered that single calculating means serves as the first and second calculating means.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
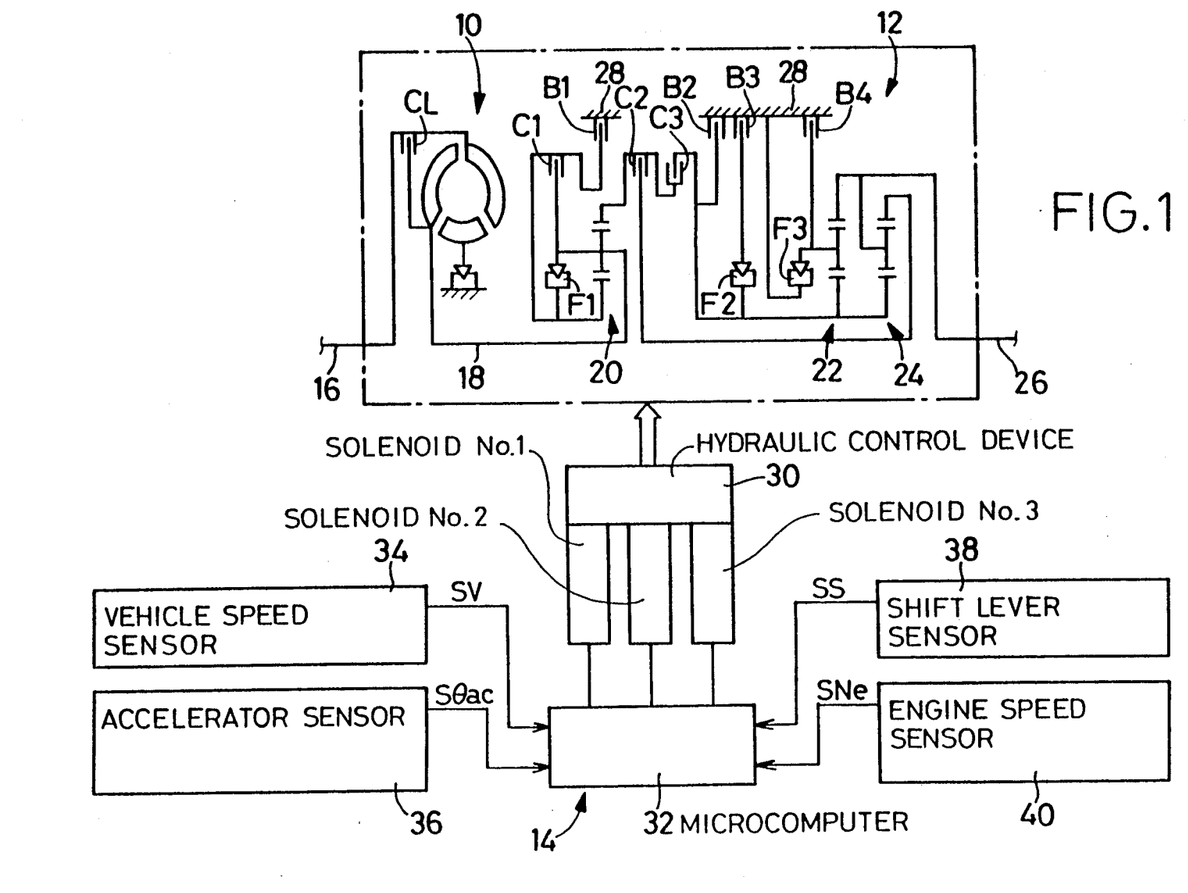
FIG. 1 is a schematic view showing a vehicle power transmitting system including an automatic transmission, and a control device which incorporates one embodiment of a clutch control apparatus of the invention for controlling a lock-up clutch of the transmission.

Referring first to FIG. 1, there is shown a part of a power transmitting system of a motor vehicle, which includes an automatic transmission to which the present invention is applicable. The automatic transmission includes a lock-up clutch CL, a fluid coupling in the form of a torque converter 10, and a speed changing mechanism in the form of a planetary gear mechanism 12. The automatic transmission (CL, 10, 12) is controlled by a control device 14 constructed according to the present invention.

The torque converter 10 has a pump impeller connected to an output shaft 16 of an engine of the vehicle, and a turbine impeller connected to an input shaft 18 of the planetary gear mechanism 12. The lock-up clutch CL is provided for coupling the output shaft 16 of the engine directly to the input shaft 18 of the planetary gear mechanism 12, when needed. The lock-up clutch CL is operated by a hydraulic actuator, between an engaged and a released position, under the control of the control device 14. Thus, the control device 14 serves as a clutch control apparatus for controlling the operation of the lock-up clutch CL.

The planetary gear mechanism 12 includes a first, a second and a third single-pinion type planetary gear unit 20, 22, 24. The first gear unit 20 is connected to the input shaft 18, while the second and third gear units 22, 24 are connected to an output shaft 26 of the mechanism 12. The output shaft 26 is connected to drive wheels of the vehicle via a differential gear device. The first, second and third planetary gear units 20, 22, 24 have the following component members: members which are integrally fixed to each other; members which are selectively connected to each other by means of three clutches C1, C2 and C3; members which are selectively fixed to a housing 28 of the transmission by means of four brakes B1, B2, B3 and B4; and members which are selectively connected to each other or fixed to the housing 28, by means of three one-way clutches F1, F2, F3, depending upon the direction of rotation of the driving members.

Figure 2:
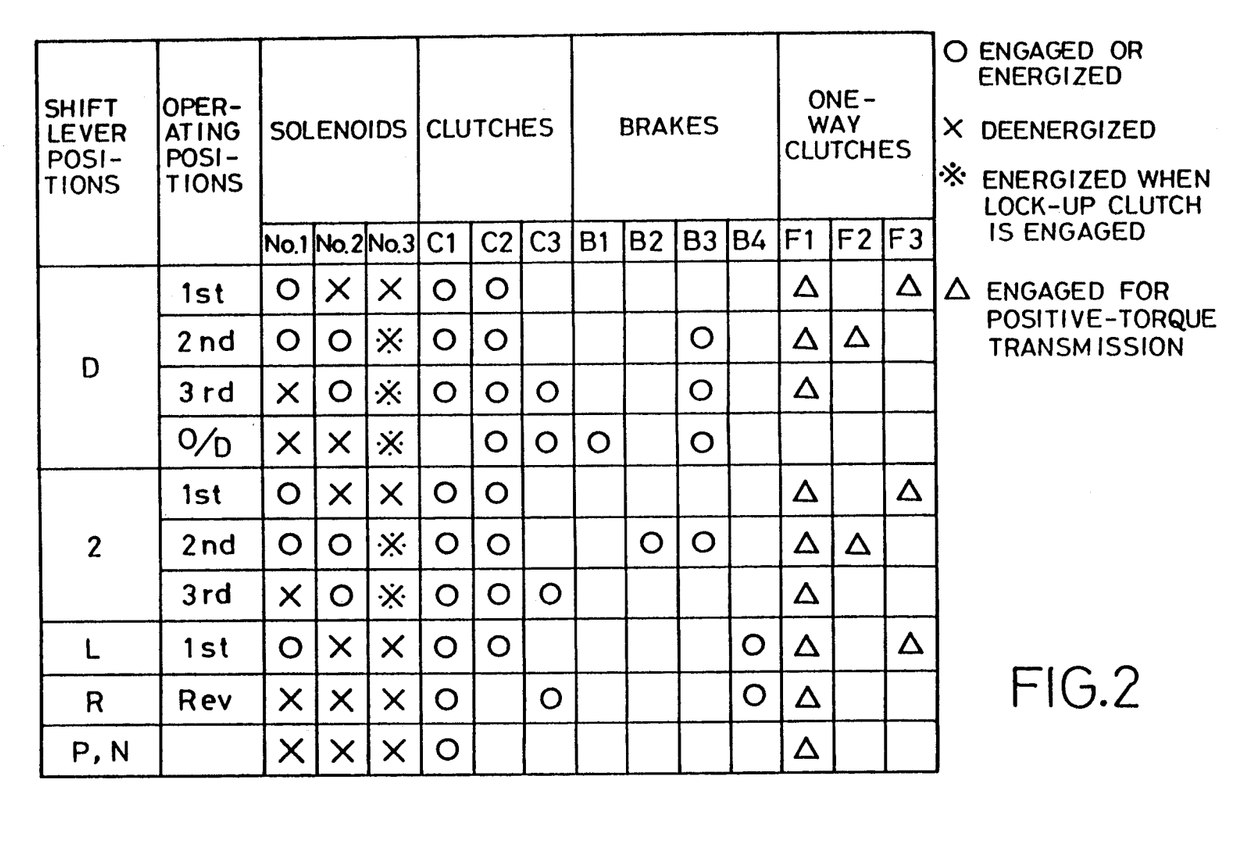
FIG. 2 is a view indicating operating states of solenoid coils and coupling elements of the automatic transmission of FIG. 1, in relation to operating positions of a planetary gear mechanism of the transmission.

The clutches C1, C2, C3 may be multiple-disk clutches, and the brakes B1, B2, B3, B4 may be band brakes each having a single band, or two bands whose winding directions are opposite to each other. These clutches and brakes are operated, i.e., engaged and disengaged, by suitable hydraulic actuators which are controlled by the control device 14, so that the automatic transmission (more precisely, planetary gear mechanism 12) is shifted from one operating position to another so as to change the speed ratio, i.e., speed of the input shaft 18/speed of the output shaft 26. As indicated in FIG. 2, the planetary gear mechanism 12 has four forward drive positions 1ST (first-speed position), 2ND (second-speed position), 3RD (third-speed position) and 0/D (overdrive position), and one reverse drive position (Rev). The speed ratio of the transmission 10, 12 (planetary gear mechanism 12) decreases in steps as the transmission is shifted up in the direction from the first-speed position 1ST toward the overdrive position 0/D.

In FIG. 1, only a half of the transmission 10, 12 on one side of the axis of rotation is shown, because the two halves are completely symmetric with each other, with respect to the rotation axis.

The control device generally indicated at 14 in FIG. 1 includes a hydraulic control device 30 having control valves, and a microcomputer 32 for controlling the operation of the hydraulic control device 30. The hydraulic control device 30 are equipped with three solenoid coils No.1, No. 2 and No. 3. The coils Nos. 1 and 2 are selectively energized or deenergized to operate the clutches C1-C3 and brakes B1-B4, so as to selectively establish the operating positions of the transmission. On the other hand, the coil No. 3 is used to operate the above-indicated hydraulic actuator for the lock-up clutch CL for directly connecting the input shaft 18 of the planetary gear mechanism 12 to the output shaft 16 of the engine, when needed.

To the microcomputer 32, there are connected a vehicle speed sensor 34, an accelerator sensor 36, a shift lever sensor 38, and an engine speed sensor 40. The vehicle speed sensor 34 generates a VEHICLE SPEED signal SV indicative of a running speed V (km/h) of the vehicle. The accelerator sensor 36 generates an ACCELERATOR POSITION signal S$\theta$ac indicative of a currently established operating position $\theta$ac of an accelerator pedal (corresponding to an angle of opening of a throttle valve of the engine). The shift lever sensor 38 generates a SHIFT LEVER POSITION signal SS indicative of a currently selected operating position of a shift lever. The engine speed sensor 40 generates an ENGINE SPEED signal SNe indicative of a speed Ne of the engine output shaft 16. The sensors 34, 36, 38, 40 may be commonly used detecting means such as angular velocity detectors.

As indicated in FIG. 2, the shift lever of the vehicle has a total of six operating positions D (drive), 2 (second), L (low), R (reverse), P (parking) and N (neutral). In the drive position D, the planetary gear mechanism 12 is selectively placed in one of the four positions 1ST, 2ND, 3RD- and O/D. In the second position 2, the planetary gear mechanism 12 is selectively placed in one of the three positions 1ST, 2ND and 3RD.

The microcomputer 32 incorporates a read-only memory which stores various control data and control programs, a random-access memory for temporarily storing data, and a central processing unit for controlling the solenoid coils Nos. 1, 2 and 3 for operating the clutches C1-C3 and brakes B1-B4 and the lock-up clutch CL, according to the control programs stored in the read-only memory, and based on the control data stored in the read-only memory, depending upon the running condition of the vehicle, while utilizing the temporary data storage function of the random-access memory. The control data stored in the read-only memory include: shift pattern data for shifting the planetary gear mechanism 12; clutch control pattern data for provisionally determining the operating position (engaged or released position) of the lock-up clutch CL; basic fuzzy set theory rules whose degrees of satisfaction are determined for the respective engaged and released positions of the lock-up clutch CL, based on the clutch control pattern data; and fuzzy set control rules whose satisfaction degrees are determined for the engaged and released positions of the lock-up clutch CL, depending upon the running condition of the vehicle.

The table in FIG. 2 indicates the operating states of the solenoid coils Nos. 1, 2 and 3, clutches C1-3, brakes B1-B4 and one-way clutches F1-F3, in relation to the operating positions of the shift lever and the operating positions of the planetary gear mechanism 12. Marks "o" and "x" associated with the solenoid coils indicate the energized and deenergized states of the solenoid coils Nos. 1, 2 and 3, respectively. Mark "*" indicates the energization of the solenoid coil No. 3 only when the lock-up clutch CL is engaged. Marks "o" associated with the clutches C1-C3 indicate the engaged state of the clutches, while the absence of the mark "o" indicates the disengaged or released state of the clutches. Marks "Δ" associated with the one-way clutches F1-F3 indicate the engagement of the one-way clutches when power is transmitted in the direction from the engine toward the vehicle drive wheels. The absence of the marks "o" indicates the released state of the one-way clutches.

Referring next to the flow chart of FIG. 3, there will be described an operation of the control device 14 for controlling the lock-up clutch CL, for illustrative purpose only.

Initially, the control flow executes step S1 to determine a provisional position Lu* of the lock-up clutch, namely, to provisionally select one of the engaged and released positions of the clutch CL. This determination is effected according to the stored clutch control patterns, and based on the detected accelerator pedal position $\theta$ac and the detected vehicle speed V. The clutch control patterns when the shift lever is placed in the drive position "D" are different from those when the shift lever is placed in the second position "2". The clutch control patterns are determined, with the vehicle speed V and accelerator pedal position $\theta$ac used as parameters representative of the vehicle running condition. An example of the clutch control patterns for the drive position "D" are illustrated in a rectangular coordinate system of FIG. 4, wherein the vehicle speed V and accelerator pedal position θac are taken along one and the other of the mutually perpendicular two axes. Stepped solid lines superposed on the coordinate system indicate clutch-engaging boundaries (OFF-ON) for engaging the lock-up clutch CL while it is placed in the released position. Stepped broken lines indicate clutch-releasing boundaries (ON→OFF) for releasing the lock-up clutch CL while it is placed in the engaged position. These clutch-engaging and clutch-releasing boundaries are provided for each of the second-speed, third-speed and overdrive positions 2ND, 3RD and 0/D of the planetary gear mechanism 12.

According to the clutch control patterns, the provisional position Lu* (either the engaged position "ON" or the released position "OFF") of the lock-up clutch CL is determined, based on the currently established position N of the planetary gear mechanism 12, the currently detected accelerator pedal position θac, and the currently detected vehicle speed V. Suppose the planetary gear mechanism 12 and the lock-up clutch CL are currently placed in the overdrive position 0/D and the engaged position, respectively, for example, a reference vehicle speed Voff is determined based on the clutch-releasing boundary (ON→OFF) for the overdrive position 0/D and the currently detected accelerator pedal position θac. If the currently detected vehicle speed V is lower than the determined reference vehicle speed Voff, the released position "OFF" of the lock-up clutch CL is selected as the provisional position Lu*. If the current vehicle speed V is higher than the reference vehicle speed Voff, the engaged position "ON" of the clutch CL is selected as the provisional position Lu*. If the lock-up clutch CL is currently placed in the released position "OFF" with the planetary gear mechanism 12 placed in the overdrive position 0/D, a reference vehicle speed Von is determined based on the clutch-engaging boundary (OFF→ON) for the overdrive position 0/D and the currently detected accelerator pedal position θac. If the current vehicle speed V is lower than the reference vehicle speed Von, the released position "OFF" of the lock-up clutch CL is selected as the provisional position Lu*. If the current vehicle speed V is higher than the reference vehicle speed Von, the engaged position "ON" is selected as the provisional position Lu* of the lock-up clutch CL. The reference vehicle speeds Voff and Von are those when the accelerator pedal position θac corresponds to about 60% opening of the throttle valve of the engine while the planetary gear mechanism 12 is placed in the overdrive position 0/D.

Where the shift lever is placed in a position other than the positions "D" and "2" or where the planetary gear mechanism 12 is placed in the first-speed or reverse position 1ST, Rev., the released position "OFF" is selected as the provisional position Lu* of the lock-up clutch CL. The currently established position N of the planetary gear mechanism 12 is detected based on the output signals applied to the solenoid coils Nos. 1 and 2. The operating position of the lock-up clutch CL is detected based on the output signal applied to the solenoid coil No. 3. The accelerator pedal position θac and the vehicle speed V are detected based on the ACCELERATOR POSITION signal Sθac and VEHICLE SPEED signal SV.

Figure 5:
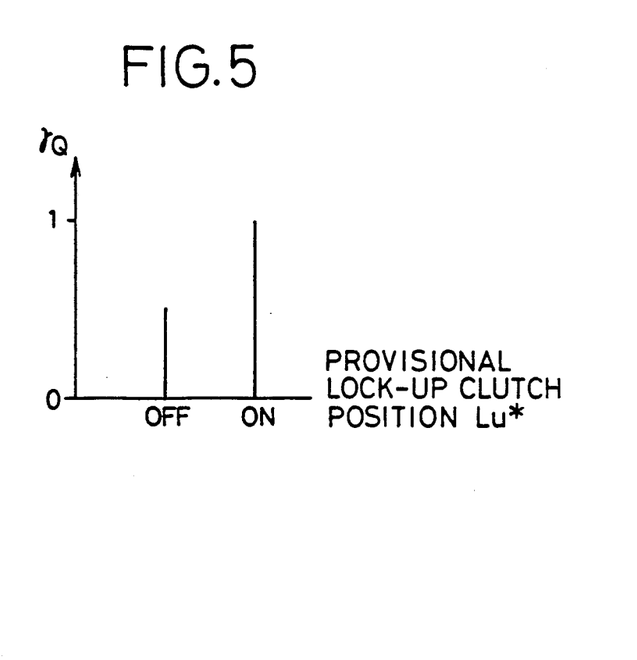
FIG. 5 is a view illustrating an example of degrees of satisfaction of a basic fuzzy set theory rule for provisionally determining the operating position of the lock-up clutch in step S2 of the flow chart of FIG. 3.

Step S1 is followed by step S2 in which degrees of satisfaction γQ(ON) and γQ(OFF) of a basic fuzzy set theory rule Q are determined. The satisfaction degree γQ(ON) represents the degree of adequacy for selecting the engaged position of the lock-up clutch CL, while the satisfaction degree γQ(OFF) represents the degree of adequacy for selecting the released position of the clutch CL. The basic fuzzy set theory rule Q is determined depending upon whether each of the engaged and released positions of the lock-up clutch CL is the same as the determined provisional position Lu*. For example, the satisfaction degree γQ is equal to "1" for one of the engaged and released positions of the lock-up clutch CL which is the same as the determined provisional position Lu*, and the satisfaction degrees γQ is equal to "0.5" for the other position of the clutch CL. FIG. 5 indicates the satisfaction degrees γQ(ON) and γQ(OFF) of the basic fuzzy set theory rule Q for selecting the engaged and released positions of the lock-up clutch CL, respectively, where the provisional position Lu* is the engaged position "ON". However, the satisfaction degree γQ for the position of the clutch CL which is different from the determined provisional position Lu* may be determined to be any desired value from "0" to "1". In the present embodiment, the portions of the microcomputer 32 assigned to execute steps S1 and S2 constitute means for determining the satisfaction degrees γQ(ON) and γQ(OFF) of the basic fuzzy set theory rule Q for the operating positions (engaged and released positions) of the lock-up clutch CL, based on the predetermined clutch control patterns.

Then, the control flow goes to step S3 in which satisfaction degrees γR(ON) γQ(OFF) of fuzzy set control rules $R_{ON}$ and $R_{OFF}$ for the engaged and released positions of the lock-up clutch CL are calculated depending upon the currently detected running condition of the vehicle. More specifically, the fuzzy set control rules $R_{ON}$ and $R_{OFF}$ use sub-rules A, B, C, D, E, F, G, H and I, as indicated below:

$R_{ON}$ = A and [{(B or C) and D} or E] and F $R_{OFF}$ = G or {(B or C) and H} or I The sub-rules A through I will be described.
Sub-Rule A—Estimated engine speed Ne' within a stable range This sub-rule A is used to determine a degree of probability as to whether the engine speed Ne' estimated when the lock-up clutch CL is engaged falls within a predetermined stable range or not. An example of a membership function $f_A$ (Ne') which indicates the degree of satisfaction of the sub-rule A is illustrated in solid line in FIG. 6. (Membership functions are formed by fitting empirical data to the application under consideration, as is known, for example "A FUZZY KNOWLEDGE-BASED SYSTEM SHELL-SYSTEM 2-1", K. S. Leung et al., PROCEEDINGS TENCON 87, IEEE, 1987, pp. 655-659. See also "SYNTHESIS OF FUZZY MODELS FOR INDUSTRIAL PROCESSES"- SOME RECENT RESULTS, R.M. Tong, Int. J. General Systems, 1978, Vol. 4, pp. 143-162.) The estimated engine speed Ne' is expressed as a function of the vehicle speed V and speed ratio of each operating position of the planetary gear mechanism 12. The stable speed range of the engine is determined by calculation or according to stored data, with the characteristics of the engine taken into account, and in relation to suitable parameters such as the engine load (as represented by the accelerator pedal position θac)

and the engine coolant temperature. The logical value of the membership function $f_A(Ne')$ is between "0" and "1" (inclusive). The sub-rule A is completely satisfied when the value of the membership function is "1", namely, when the estimated engine speed Ne' is within the stable range. This applies to other membership functions which will be described.

Sub-Rule B—Accelerator pedal being depressed

This sub-rule B is provided to determine a degree of probability as to whether or not a rate $\overline{\theta}ac)$ ($=d\overline{\theta}ac/dt$) at which the accelerator pedal position $\theta ac$ is changed exceeds a predetermined positive value. An example of a membership function $f_B(\overline{\theta}ac)$ indicative of the degree of satisfaction of this sub-rule B is indicated in solid line in FIG. 7.

Sub-Rule C—Accelerator pedal being released

This sub-rule C is provided to determine a degree of probability as to whether or not the above-indicated rate $\overline{\theta}ac$ is smaller than a predetermined negative value. An example of a membership function $f_C(\overline{\theta}ac)$ which represents the satisfaction degree of this sub-rule C is indicated in one-dot chain line in FIG. 7.

Sub-Rule D—Vehicle body vibrations not likely to be generated

Figure 8:
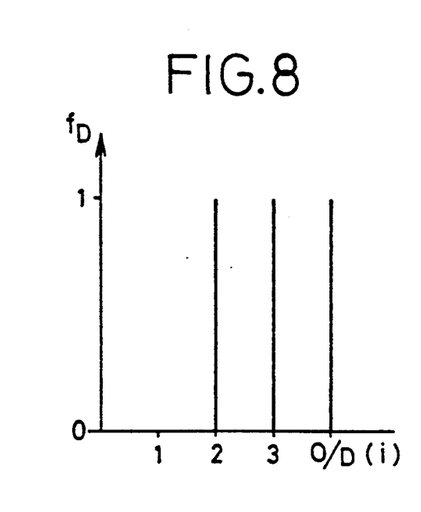

A variation in the torque of the engine will cause vibrations of the vehicle body while the lock-up clutch CL is engaged. Generally, the influence of the engine torque variation in generating the vehicle body vibrations during engagement of the lock-up clutch CL increases with an increase in the speed ratio of the planetary gear mechanism 12. The sub-rule D is provided to inhibit the lock-up clutch CL from being engaged when the planetary gear mechanism 12 is in the first-speed position 1ST which has a high speed reduction ratio. An example of a membership function $f_D(i)$ representing the satisfaction degree of this sub-rule D is illustrated in FIG. 8. A variable "i" of this membership function $f_D(i)$ indicates the operating position of the planetary gear mechanism 12. Although the logical values of the membership function $f_D(i)$ for the second-speed, third-speed and overdrive positions 2ND, 3RD and 0/D are all equal to "1" in the example of FIG. 8, these values may progressively increase with a decrease in the speed reduction radio of the operating positions of the planetary gear mechanism 12. For instance, the value of the membership function $f_D(2)$ is "0.5" and the value of the membership function $f_D(3)$ is "0.75".

Sub-Rule E—Accelerator pedal position kept constant

This sub-rule D is used to determine a degree of probability as to whether the accelerator pedal position is kept constant, that is, whether the above-indicated rate $\overline{\theta}ac$ of change of the accelerator pedal position $\theta ac$ is almost zero or not. An example of a membership function $f_D(\overline{\theta}ac)$ which represents the satisfaction degree of the sub-rule E is illustrated in two-dot chain line in FIG. 7.

Sub-Rule F —Shift lever placed in position "D" or "2"

Figure 9:
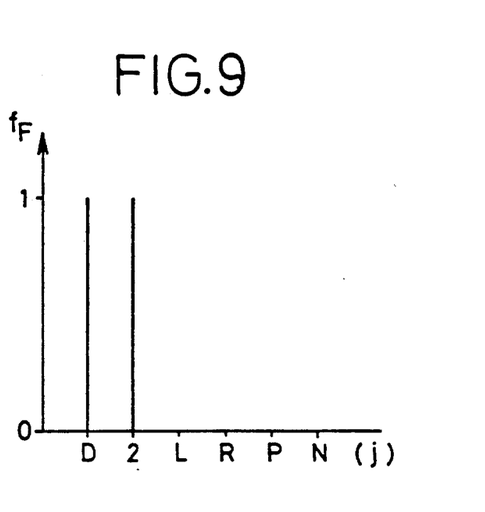

This sub-rule F is provided to permit the lock-up clutch CL to be engaged only when the shift lever is placed in the drive or second position "D" or "2". An example of a membership function $f_F(j)$ representing the satisfaction degree of this sub-rule F is illustrated in FIG. 9. A variable "j" of this membership function represents the operating positions of the shift lever. It is noted that the lock-up clutch CL is desirably placed in the released position while the shift lever is placed in the low or reverse position "L" or "R", since the accelerator pedal is operated at a relatively high speed with the shift lever in the low or reverse position. Further, the lock-up clutch CL is in the released position while the shift lever is placed in the parking or neutral position "P" or "N".

Sub-Rule G—Estimated engine speed Ne' within an unstable range

The satisfaction degree of this sub-rule G has a meaning contrary to that of the sub-rule A. Namely, the sub-rule G is provided to inhibit the lock-up clutch CL from being engaged when the estimated engine speed, Ne falls within an unstable range if the clutch CL is engaged. An example of a membership function $f_G(Ne')$ representing the satisfaction degree of this sub-rule G is illustrated in one-dot chain line in FIG. 6.

Sub-Rule H—Vehicle body vibrations likely to be generated

Figure 10:
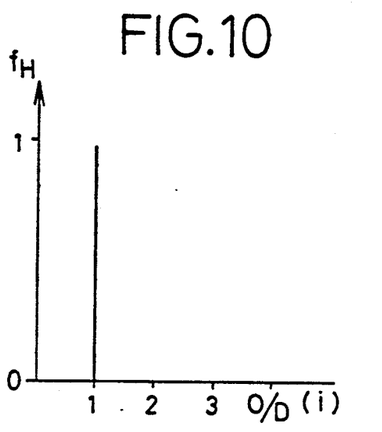

The satisfaction degree of this sub-rule H has a meaning contrary to that of the sub-rule D. That is, the sub-rule H is provided to release the lock-up clutch CL when the vehicle body vibrations are likely to be generated if the clutch CL is engaged, i.e., when the planetary gear mechanism 12 is placed in the first-speed position 1ST. An example of a membership function $f_G(i)$ representing the satisfaction degree of this sub-rule H is illustrated in FIG. 10.

Sub-Rule I—Shift lever not placed in position "D" or "2"

Figure 11:
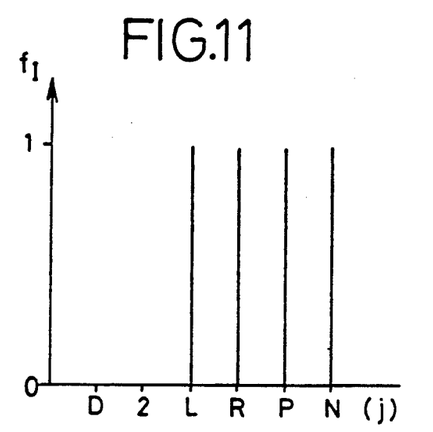

The satisfaction degree of this sub-rule I has a meaning contrary to that of the sub-rule F. An example of a membership function $f_I(j)$ representing the satisfaction degree of this sub-rule I is illustrated in in FIG. 11. The variable "j" represents the operating positions of the shift lever.

According to the fuzzy set theory, "and" represents an algebraic multiplication (ordinary multiplication), or a minimum operation, and "or" represents a logical sum or a maximum operation. Where the "and" and "or" represent the algebraic multiplication and the maximum operation, respectively, satisfaction degrees $\gamma R(ON)$ and $\gamma R(OFF)$ of the fuzzy set control rules $R_{ON}$ and $R_{OFF}$ are obtained from the following equations (1) and (2), respectively:

$$\gamma R(ON) = f_A(Ne') \times \max[\max\{f_B(\overline{\theta}ac), f_C(\overline{\theta}ac)\} \times \qquad (1)$$

$$f_D(i), f_E(\theta ac)] \times f_F(j)$$

$$\gamma R(OFF) = \max[f_G(Ne'), \max\{f_B(\overline{\theta}ac), f_C(\overline{\theta}ac) \times f_H(i), f_I(j)] \qquad (2)$$

After the satisfaction degrees $\gamma R(ON)$ and $\gamma R(OFF)$ are calculated in step S3, the control flow goes to step S4 to calculate the overall satisfaction degrees $\gamma(ON)$ and $\gamma(OFF)$ for selecting the engaged and released positions of the lock-up clutch CL, respectively, according to the following equations (3) and (4), respectively, by algebraic multiplication of the satisfaction degree $\gamma R(ON)$ or $\gamma R(OFF)$ obtained in step S3 and the satisfaction degree $\gamma Q(ON)$ or $\gamma Q(OFF)$ obtained in step S2. The calculated overall satisfaction degrees $\gamma(ON)$ and $\gamma(OFF)$ means the degrees of adequacy for engaging and releasing the lock-up clutch CL, respectively.

$$\gamma(ON) = \gamma R(ON) \times \gamma Q(ON) \qquad (3)$$

$$\gamma(OFF) = \gamma R(OFF) \times \gamma Q(OFF) \qquad (4)$$

Figure 12:
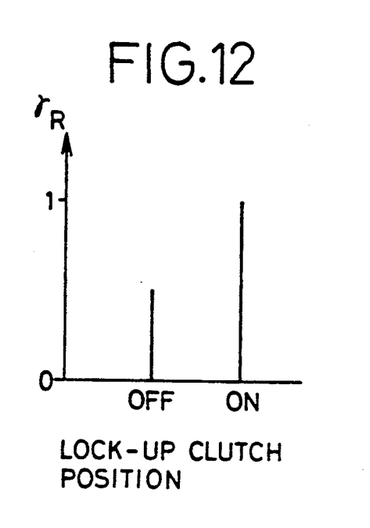
FIG. 12 is a graph indicating an example of control rule satisfaction degrees determined in step S3 of the flow chart of FIG. 3.
Figure 13:
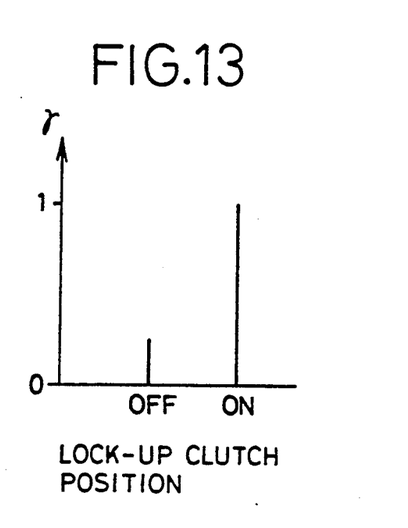
FIG. 13 is a view indicating an example of overall satisfaction degrees determined in step S4 of the flow chart of FIG. 3.

An example of the satisfaction degrees γR(ON) and γR(OFF) calculated in step S3 is indicated in FIG. 12, and an example of the overall satisfaction degrees γ(ON) and γR(OFF) calculated in step S4 is indicated in FIG. 13. In the present embodiment, the portion of the microcomputer 32 assigned to execute step S3 constitutes first calculating means for calculating the satisfaction degrees γR(ON) and γR(OFF) of the fuzzy set control rules for the engaged and released positions of the lock-up clutch CL, depending upon the running condition of the vehicle. Further, the portion of the microcomputer 32 assigned to execute step S4 constitutes second calculating means for calculating the overall degrees of adequacy γ(ON) and γ(OFF) for selecting the engaged and released positions of the clutch CL, based on the satisfaction degrees γQ(ON) and γQ (OFF) determined in step S2, and the satisfaction degrees YR(ON) and qR(OFF) calculated in step S3.

After the two overall degrees of adequacy γ(ON) and γ(OFF) have been obtained in step S4, the control flow goes to step S5 in which the higher one of the adequacy degrees γ(ON) and γ(OFF) is selected by a maximum operation according to the following equation (5). In the example of FIG. 13, the overall adequacy degree γ(ON) is selected as the higher adequacy degree γ(k). Namely, "k" is determined to be "ON" representative of the engaged position of the lock-up clutch CL. In the next step S6, the solenoid coil No. 3 is energized to establish the engaged position of the lock-up clutch. Portions of the microcomputer 32 assigned to execute steps S5 and S6 constitute means for determining, based on the determined higher overall satisfaction degree γ(k), the position in which the lock-up clutch CL is placed.

$$\gamma(k) = \max \{(ON, \gamma(OFF)\} \quad (5)$$

In the control device 14 including the microcomputer 32 and the hydraulic control device 30, the satisfaction degrees γQ(ON) and γQ(OFF) of the basic fuzzy set theory rule Q are determined in steps S1 and S2, for the two operating positions of the lock-up clutch CL, based on the predetermined clutch control patterns whose data are stored in the read-only memory of the microcomputer 32. Further, the satisfaction degrees γR(ON) and γR(OFF) of the fuzzy set control rules $R_{ON}$ and $R_{OFF}$ are determined in step S3, for both of the engaged and released positions of the clutch CL, depending upon the running condition of the vehicle (represented by the satisfaction degrees of the sub-rules A through I). Based on the obtained satisfaction degrees γQ(ON), γQ(OFF) and of adequacy γR(ON), γR(OFF), the overall degrees γ(ON) and γ(OFF) for selecting the engaged and released positions of the lock-up clutch CL are calculated in step S4. The higher value γ(k) of the calculated overall adequacy degrees is determined in step S5, and the engaged or released position of the lock-up clutch CL represented by "k" is established in step S6. Therefore, the present control device 14 permits the lock-up clutch CL to be suitably engaged and released, depending upon the various running parameters of the vehicle (which collectively define the running condition), which cannot be dealt with by an arrangement which is adapted to control the lock-up clutch based on only the predetermined clutch control patterns which use the accelerator pedal position θac and vehicle running speed V as the control parameters.

Further, the present control device 14 which relies on both the clutch control patterns and the fuzzy set control rules as explained above requires a reduced amount of control program data, as compared with an arrangement which uses many clutch control patterns and pattern compensating maps to control the lock-up clutch depending upon many running parameters of the vehicle. Where the control rules are used to monitor the vehicle running parameters for determining the position of the lock-up clutch, the required amount of control data is proportional to the number of the parameters. Where the clutch control patterns or compensating maps are provided corresponding to many different running conditions (combinations of running parameters) of the vehicle, the number of the required patterns or compensating maps is proportional to the number of the running parameters raised to n-th power. Accordingly, the required amount of control program data exponentially increases as the number of the parameters increases for improving the control accuracy of the lock-up clutch.

Figure 14:
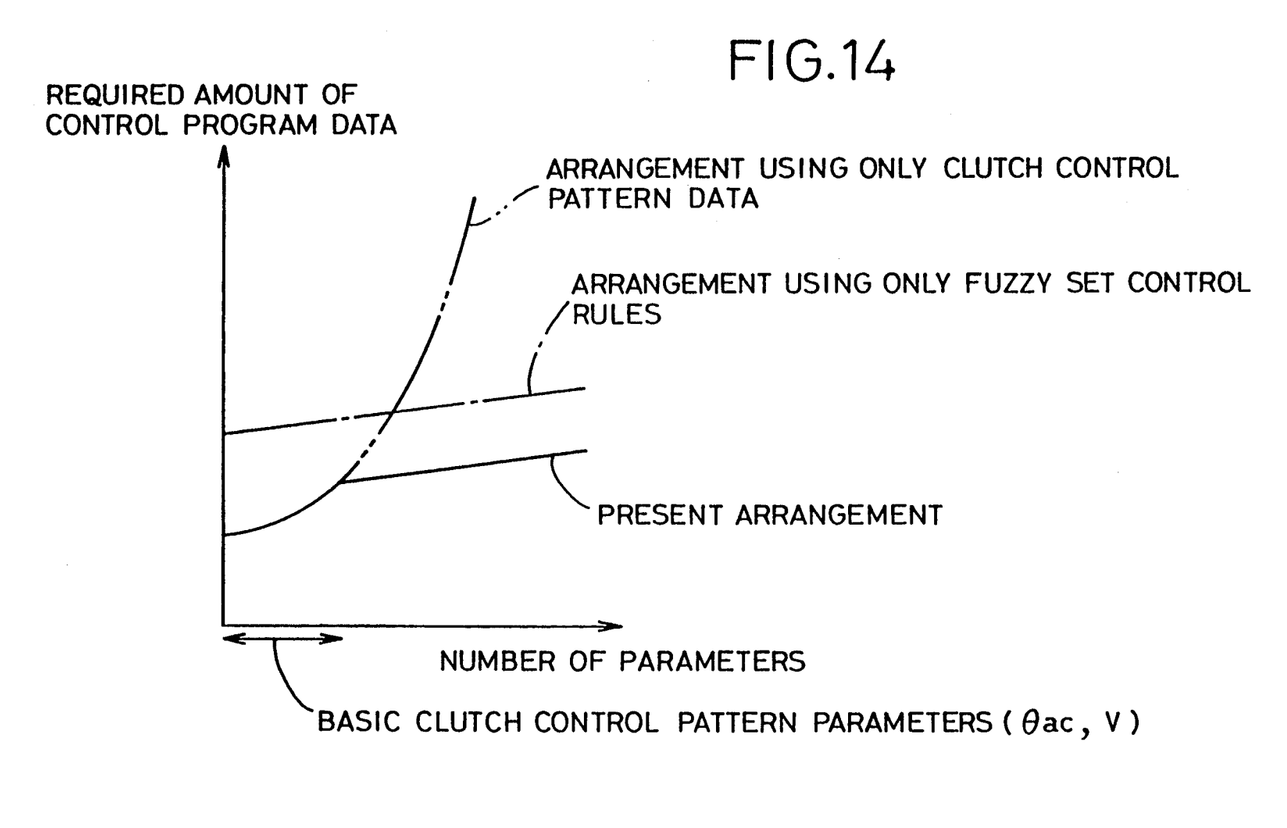
FIG. 14 is a view showing an increase in the volume of program data with an increase in the number of control parameters, according to the present invention, as compared with those according to comparative arrangements.

It is also noted that the present control device 14 uses the clutch control patterns for the positions 2ND, 3RD and 0/D of the planetary gear mechanism 12. Each clutch control pattern is formulated with the vehicle speed V and accelerator position θac used as the two basic parameters. This arrangement reduces the required overall amount of control program data, as compared with an arrangement which uses only fuzzy set control rules (two or more sets of fuzzy set control rules for two or more operating positions of an automatic transmission). The graph in FIG. 14 shows the required amounts of control program data, in relation to the number of the running parameters of the vehicle used for controlling the lock-up clutch. Solid line indicates the amount required by the control device 14 of the present invention, while one-dot chain line indicates the amount required by the arrangement which uses only the fuzzy set control rules. Two-dot chain line indicates the amount required by the arrangement which uses only the clutch control patterns and pattern compensating data maps.

In the present control device 14, the overall adequacy degrees γ(ON) and γ(OFF) for the two positions of the lock-up clutch CL are calculated, and one of these two positions is selected based on the higher adequacy degree γ(ON) or γ(OFF). This arrangement does not require a procedure otherwise required for improving the control accuracy, as practiced in the arrangement wherein the clutch control patterns are compensated or modified by obtaining the center of distribution of the calculated satisfaction degrees of the fuzzy set control rules. In this respect, too, the present control device 14 reduces the required amount of the control program data.

Figure 6:
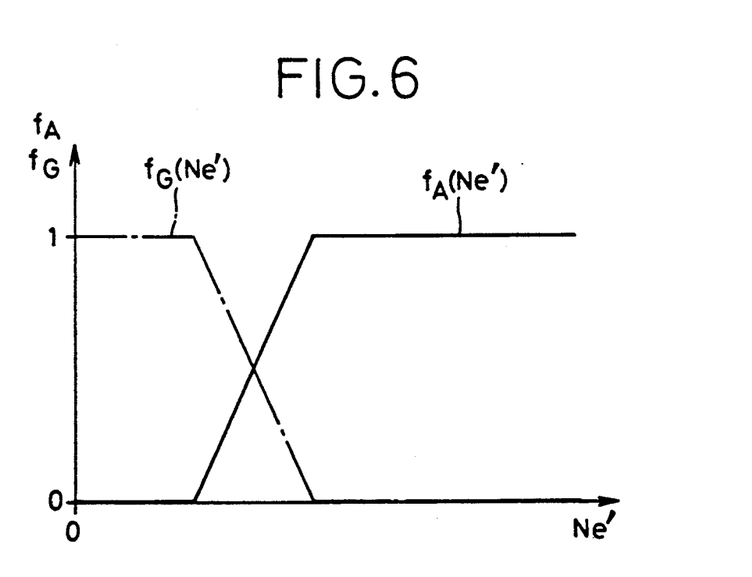
FIGS. 6 through 11 are graphs indicating examples of fuzzy set membership functions of sub-rules of control rules used in step S3 of the flow chart of FIG. 3.
Figure 7:
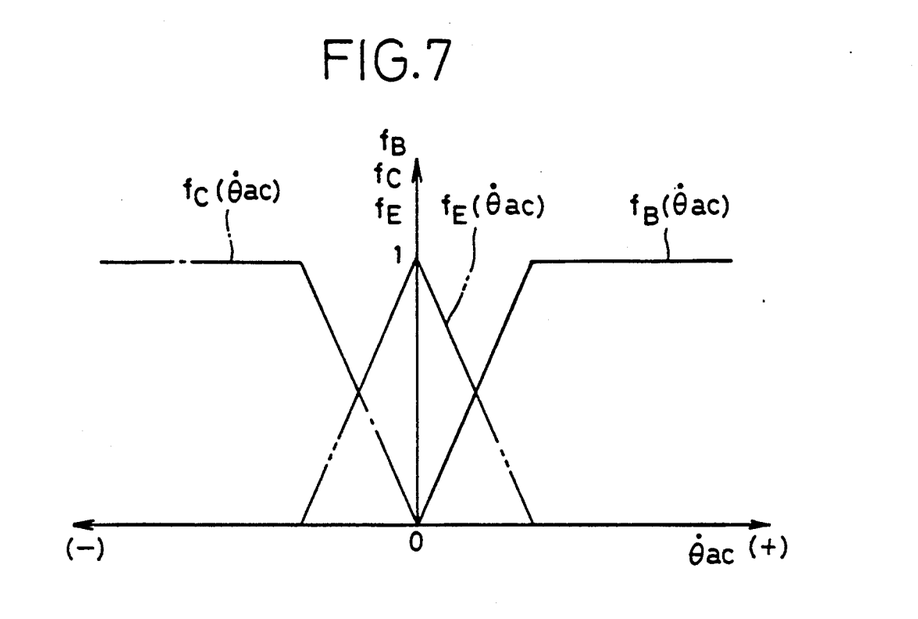

In the present control device 14, the membership functions $f_A(Ne')$, $f_B(\theta ac)$, $f_C(\theta ac)$, $f_E(\theta ac)$ and $f_G(Ne')$ representing the satisfaction degrees of the sub-rules A, B, C, E and G include a gradient or gradients as indicated in FIGS. 6 and 7, so that the manner of controlling the lock-up clutch CL may be adjusted as desired by suitably determining the gradient or gradients. In addition, the operation of the present control device 14 adapted to control the lock-up clutch CL according to the fuzzy set theory is less likely to be significantly influenced by malfunction or defect of any sensors 34, 36, 38, 40 used to detect the running parameters (running condition) of the vehicle. Generally, it is difficult to accurately detect the rate $\bar{\theta}ac$ of change of the accelerator pedal position $\theta ac$. However, the selection of the engaged or released position of the lock-up clutch CL according to the fuzzy set theory is not considerably affected by an error in the measurement of the rate.

Figure 15:
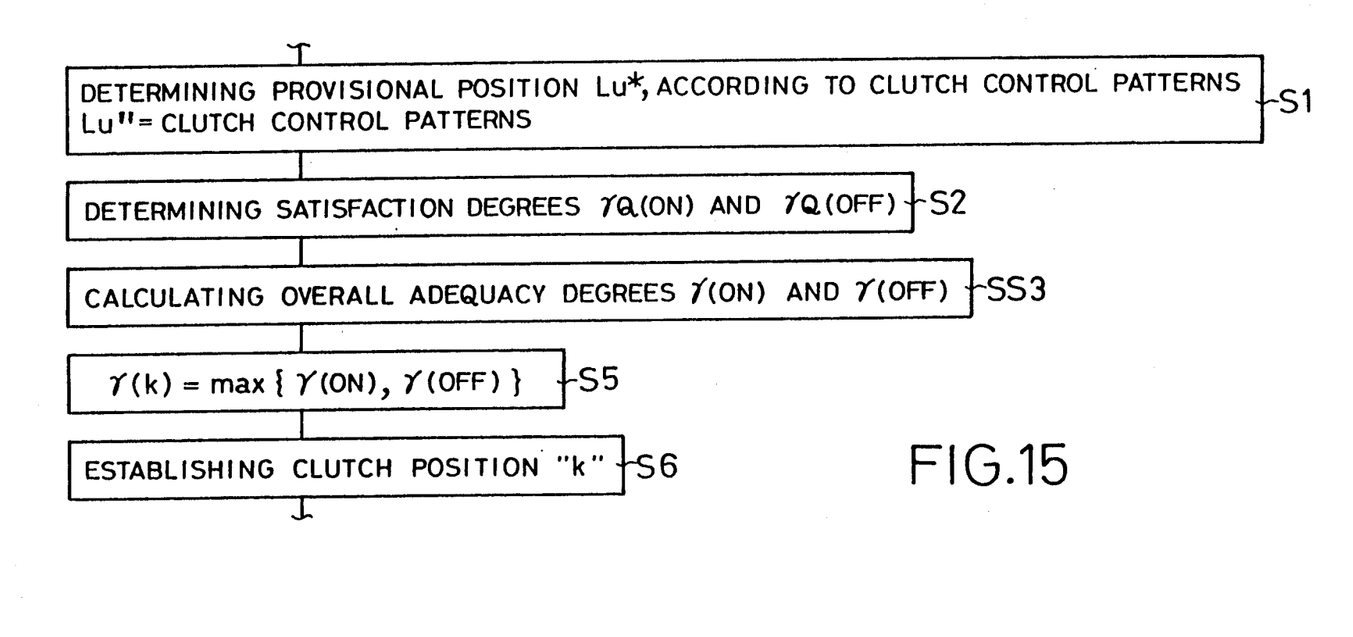
FIG. 15 is a flow chart showing another embodiment of the present invention.

Referring next to FIG. 15, another embodiment of the present invention will be described. The control program used in this embodiment is different from that in the preceding embodiment, only in terms of steps SS3 which is substituted for steps S3 and S4. In the interest of brevity and simplification, only the step SS3 will be described.

In step SS3, overall adequacy degrees $\gamma(ON)$ and $\gamma(OFF)$ for selecting the engaged and released positions of the lock-up clutch CL are calculated according to complex control rules $R_{ON}$ and $R_{OFF}$, depending upon the running condition of the vehicle. That is, the satisfaction degree $\gamma(ON)$ of the complex control rule $R_{ON}$ indicates the degree of adequacy for engaging the lock-up clutch CL, while the satisfaction degree $\gamma(OFF)$ of the complex control rule $R_{OFF}$ indicates the degree of adequacy for releasing the lock-up clutch CL. As indicated below, the complex control rule $R_{ON}$ includes the basic fuzzy set theory rule Q, and a fuzzy set control sub-rule J, while the complex control rule $R_{OFF}$ includes the basic fuzzy set theory rule Q, and a fuzzy set control sub-rule K.

$R_{ON} = Q$ and J
$R_{OFF} = Q$ or K

Figure 16:
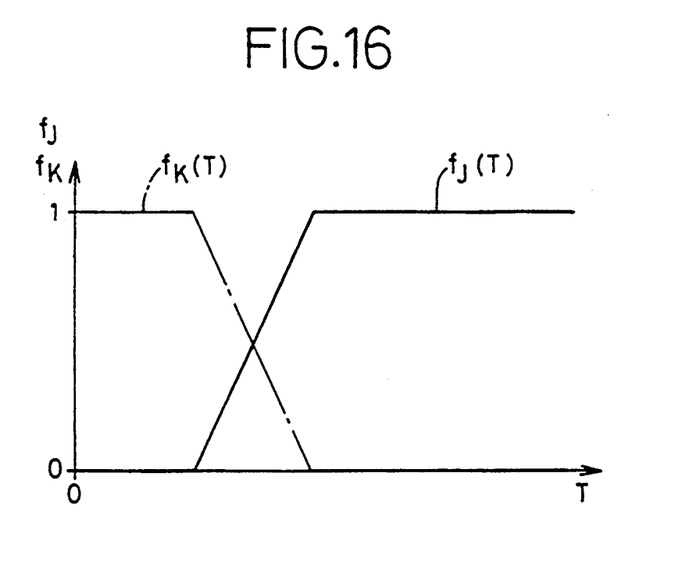
FIG. 16 is a view an example of fuzzy set membership functions used in step SS3 of the flow chart of FIG. 15.

Sub-Rule J—Time elapse T after the last releasing of clutch CL exceeding a threshold value This sub-rule J is provided to avoid frequent alternate engaging and releasing operations of the lock-up clutch CL at excessively short time intervals. An example of a membership function $f_J(T)$ is illustrated in solid line in FIG. 16.

Sub-Rule K—Time elapse T after the last releasing of clutch CL shorter than a threshold value The satisfaction degree of this sub-rule K has a meaning contrary to that of the sub-rule J. An example of a membership function $f_K(T)$ is illustrated in one-dot chain line in FIG. 16.

Where "and" and "or" represent the algebraic multiplication and maximum operation, respectively, the satisfaction degrees $\gamma(ON)$ and $\gamma(OFF)$ of the complex control rules $R_{ON}$ and $R_{OFF}$ are obtained from the following equations (6) and (7), respectively:

$\gamma(ON) = \gamma Q(ON) \times f_J(T)$ (6)
$\gamma(OFF) = \max \{\gamma Q(OFF), f_K(T)\}$ (7)

Figure 3:
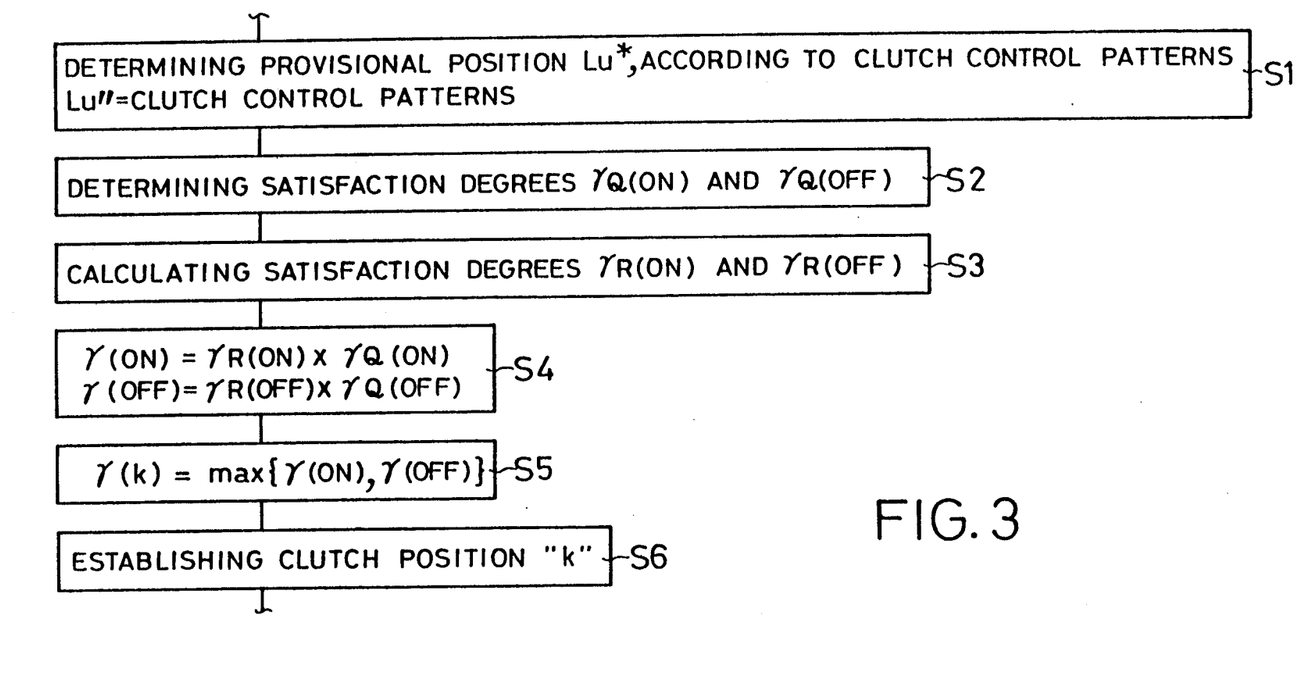
FIG. 3 is a flow chart illustrating an operation of the clutch control apparatus of FIG. 1.

The present embodiment of FIG. 15 provides the same advantages as the preceding embodiment of FIG. 3. In addition, the use of the complex control rules $R_{ON}$ and $R_{OFF}$ incorporating the basic fuzzy set theory rule Q permits the overall adequacy degrees $\gamma(ON)$ and $\gamma(OFF)$ to be obtained in one step (in step SS3). Accordingly, the required amount of control program data is further reduced.

In the present modified embodiment, the portion of the microcomputer 32 assigned to execute steps SS3 serve as first calculating means for calculating the satisfaction degrees of the sub-rules J and K, depending upon the running condition of the vehicle, and also serve as second calculating means for calculating the overall adequacy degrees $\gamma(ON)$ and $\gamma(OFF)$, by multiplying the satisfaction degrees calculated by the first calculating means, by the satisfaction degrees of the fuzzy set control sub-rules J and K. Thus, it will be understood that the sub-rules J and K of the complex control rules $R_{ON}$ and $R_{OFF}$ correspond to the fuzzy set control rules $R_{ON}$ and $R_{OFF}$ of the preceding embodiment.

While the present invention has been described in its presently preferred embodiments, it is to be understood that the invention is not limited to the details of the illustrated embodiment, and may be otherwise embodied.

In step S2 of the illustrated embodiment, the satisfaction degree $\gamma Q(ON)$ or $\gamma Q(OFF)$ for one of the engaged and released positions of the lock-up clutch CL which is the same as the position Lu* provisionally determined in step S1 is determined to be "1", and the satisfaction degree for the other position of the clutch CL is determined to be "0.5". However, each of these two satisfaction degrees $\gamma Q(ON)$ and $\gamma Q(OFF)$ is determined otherwise for improved accuracy, for example, changed in two or more steps with a difference between the actually detected vehicle speed V and the vehicle speed Von or Voff, according to a predetermined equation or a suitable membership function.

In the illustrated embodiments, the clutch control patterns used for the provisionally determining the position Lu* of the clutch CL is represented by 90° stepped clutch-engaging and clutch-releasing boundaries boundaries defined in a rectangular coordinate system wherein the accelerator position $\theta ac$ and the vehicle speed V are taken along the mutually perpendicular axes, as indicated in FIG. 4. However, the clutch-engaging and clutch-releasing boundaries may be represented by straight, curved or other lines. Further, the clutch control patterns may use parameters other than the accelerator position $\theta ac$ and the vehicle speed V. The clutch control patterns may be modified or compensated according to a suitable data map, so as to meet the specific characteristics of the vehicle engine, so that the provisional position N* of the clutch CL is determined according to the compensated control patterns.

Although the "and" and "or" used in the fuzzy set rules $R_{ON}$ and $R_{OFF}$ and complex control rules $R_{ON}$ and $R_{OFF}$ represent the algebraic multiplication and the maximum operation, respectively, the "and" and "or" may be defined to represent other operations. Further, the fuzzy set control rules or complex control rules may use operators other than "and" and "or".

The fuzzy set control rules $R_{ON}$, $R_{OFF}$ and the complex control rules $R_{ON}$ and $R_{OFF}$ are used in the illustrated embodiments, these control rules may be modified as needed, or other control rules may be employed.

While the illustrated embodiments are adapted to engage the lock-up clutch CL while the planetary gear mechanism 12 is placed in one of the second-speed, third-speed and overdrive positions (2ND, 3RD and O/D), it is possible that the lock-up clutch CL is engaged in the third-speed and overdrive positions, or in the overdrive position only.

While the planetary gear mechanism 12 of the automatic transmission in the illustrated embodiments has four forward drive positions and one rear drive position, the control apparatus according to the present invention may apply to other types of automatic transmission whose planetary gear mechanism 12 has a desired number of forward and reverse drive positions. The automatic transmission to which the present invention is applicable may use a belt-and-pulley type continuously variable transmission mechanism, in place of the planetary gear mechanism 12.

It will be understood that the invention may be embodied with various other changes, modifications and improvements, which may occur to those skilled in the art, without departing from the spirit and scope of the invention defined in the following claims.

What is claimed is:

1. An apparatus for controlling a lock-up clutch of an automatic transmission for a motor vehicle wherein an engine is connected to a speed changing mechanism through a fluid coupling when said lock-up clutch is placed in a released position, and is directly connected to said speed changing mechanism when said lock-up clutch is placed in an engaged position, said released and engaged positions of the lock-up clutch being selected according to a predetermined clutch control pattern, said apparatus comprising:

determining means for determining degrees of satisfaction of each of at least one basic fuzzy set theory rule which corresponds to said released and engaged positions of said lock-up clutch, respectively, based on said predetermined clutch control pattern;

detecting means for detecting a running condition of the vehicle;

first calculating means for calculating degrees of satisfaction of fuzzy set control rules, which correspond to said released and engaged positions, respectively, depending upon the running condition of the vehicle detected by said detecting means;

second calculating means for calculating overall degrees of adequacy for selecting said released and engaged positions, respectively, based on the degrees of satisfaction of said at least one basic fuzzy set theory rule determined by said determining means and the degrees of satisfaction of said fuzzy set control rules calculated by said first calculating means; and selecting means for selecting one of said released and engaged positions of the lock-up clutch, based on said overall degrees of adequacy calculated by said second calculating means, so that the lock-up clutch is placed in the selected one of the released and engaged positions.

2. An apparatus according to claim 1, wherein said determining means provisionally selects one of said released and engaged positions of said lock-up clutch as a provisional position Lu* according to said predetermined clutch control pattern, and said at least one basic fuzzy set theory rule consists of a basic fuzzy set theory rule whose satisfaction degree corresponding to the selected one position of the lock-up clutch is higher than that corresponding to the other position.

3. An apparatus according to claim 1, wherein said fuzzy set control rules whose degrees of satisfaction are calculated by said first calculating means consist of a first control rule $R_{ON}$ for selecting the engaged position of the lock-up clutch, and a second control rule $R_{OFF}$ for selecting the released position of the lock-up clutch, said first and second control rules $R_{ON}$ and $R_{OFF}$ are expressed by the following formulas:

$R_{ON} = A$ and $[\{(B$ or $C)$ and $D\}$ or $E]$ and $F$
$R_{OFF} = G$ or $\{(B$ or $C)$ and $H\}$ or $I$ where, "A" represents a sub-rule A for determining a probability degree in which a speed of said engine falls within a stable range if said lock-up clutch is operated in said engaged position, "B" represents a sub-rule B for determining a probability degree inn which an accelerator pedal of the vehicle is in the process of being depressed, "C" represents a sub-rule C for determining a probability degree in which said accelerator pedal is in the process of being released, "D" represents a sub-rule D for determining a probability degree in which vibrations of the vehicle are not likely to be generated by the lock-up clutch if said lock-up clutch is operated to said engaged position, "E" represents a sub-rule E for determining a probability degree in which said accelerator pedal is held at a constant position, "F" represents a sub-rule F for determining a probability degree in which said speed changing mechanism is placed in a second-speed position or an overdrive position, "G" represents a sub-rule G for determining a probability degree in which said speed of said engine falls within an unstable range if said lock-up clutch is operated to said engaged position, "H" represents a sub-rule H for determining a probability degree in which vibrations of the vehicle are likely to be generated by said lock-up clutch if said lock-up clutch is operated too said engaged position, and "I" represents a sub-rule I for determining a probability degree in which said speed changing mechanism is not placed in said second-speed position or said overdrive position.

4. An apparatus according to claim 1, wherein said second calculating means calculates said overall degrees of adequacy of for said released and engaged positions of the lock-up clutch, respectively, each by obtaining an algebraic product of a corresponding one of the degrees of satisfaction of said at least one basic fuzzy set theory rule for said released and engaged positions which are determined by said determining means, and a corresponding one of the degrees of satisfaction of said fuzzy set control rules for said released and engaged positions which are calculated by said first calculating means.

5. An apparatus according too claim 1, wherein said fuzzy set control rules and said at least one basic fuzzy set theory rule are selectively combined to provide a plurality of complex control rules whose degrees of satisfaction provide said overall degrees of adequacy for selecting said released and engaged positions of said lock-up clutch.

6. An apparatus according to claim 5, wherein said determining means provisionally selects one of said released and engaged positions of said lock-up clutch as a provisional position Lu* according to said predetermined clutch control pattern, and said at least one basic fuzzy set theory rule consists of a basic fuzzy set theory rule Q whose degree of satisfaction corresponding to the selected one position of the lock-up clutch is higher than that corresponding to the other position, said plurality of complex control rules consist of a first complex control rule $R_{ON}$ for selecting said engaged position of the lock-up clutch, and a second complex control rule $R_{OFF}$ for selecting said released position of the lock-up clutch, said first and second complex control rules $R_{ON}$ and $R_{OFF}$ being expressed by the following formulas:

$R_{ON} = Q$ and $J$
$R_{OFF} = Q$ or $K$ where, "J" represents a sub-rule j for determining a probability degree in which a time elapse after a last releasing action of said lock-up clutch is longer than a predetermined value, and "K" represents a sub-rule K for determining a probability degree in which said time elapse is shorter than said predetermined value.

* * * * *